United States Patent
Amin-Shahidi et al.

(10) Patent No.: US 11,936,269 B2
(45) Date of Patent: Mar. 19, 2024

(54) HAPTIC ENGINE BASED ON ANGULAR RESONANT ACTUATOR WITH PIVOT AXIS AND MASS CENTER THAT DIFFER

(71) Applicant: Apple Inc., Cupertino, CA (US)

(72) Inventors: Darya Amin-Shahidi, Menlo Park, CA (US); Alex M. Lee, Mountain View, CA (US); Denis G. Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/482,210

(22) Filed: Sep. 22, 2021

(65) Prior Publication Data

US 2023/0086204 A1     Mar. 23, 2023

(51) Int. Cl.
    *H02K 33/18*        (2006.01)
    *H02K 33/02*        (2006.01)
    *B06B 1/04*         (2006.01)

(52) U.S. Cl.
    CPC ............ *H02K 33/18* (2013.01); *H02K 33/02* (2013.01); *B06B 1/045* (2013.01)

(58) Field of Classification Search
    CPC .. H02K 7/1869; H02K 7/1876; H02K 7/1892; H02K 33/00; H02K 33/02; H02K 33/06; H02K 33/10; H02K 33/12; H02K 33/14; H02K 33/16; H02K 33/18; H02K 35/00; H02K 33/04; H02K 35/02; H02K 35/04; H02N 2/188; B06B 1/045
    USPC ...... 310/15–36, 12.12, 12.15, 12.01, 81, 80, 310/321, 28–30, 36–37
See application file for complete search history.

(56) References Cited

U.S. PATENT DOCUMENTS 3,591,815 A * 7/1971 Grootenhuis ............ G01H 1/10
                                                310/27
4,135,119 A * 1/1979 Brosens ................. H01F 7/145
                                                318/128

(Continued)

FOREIGN PATENT DOCUMENTS

AT        WO-8907987 A1 * 2/1988
DE             4036532 C1 * 11/1990

(Continued)

*Primary Examiner* — Maged M Almawri
(74) *Attorney, Agent, or Firm* — Brownstein Hyatt Farber Schreck, LLP

(57) ABSTRACT

In one embodiment of the present disclosure a haptic actuator is disclosed. The haptic actuator includes a housing, a movable mass, and a pivot assembly attaching the movable mass to the housing. The pivot assembly defines a pivot axis, and the movable mass has a mass center offset from the pivot axis along a lever arm extending perpendicular to the pivot axis. The haptic actuator includes a spring extending between the movable mass and the housing. The spring stores and releases energy received from movement of the movable mass. The spring prevents full rotation of the movable mass about the pivot axis. The haptic actuator includes an electric coil attached to the movable mass. The electric coil intersects the lever arm. The haptic actuator includes at least one magnet attached to the housing. The magnet is at least partially aligned with the electric coil. The movable mass moves with respect to the at least one magnet when a signal is applied to the coil.

17 Claims, 9 Drawing Sheets

(56) References Cited

U.S. PATENT DOCUMENTS

| | | | | |
|---|---|---|---|---|
| 5,180,939 | A * | 1/1993 | Rosswurm | F02G 1/0435 |
| | | | | 290/1 R |
| 5,386,728 | A * | 2/1995 | Norton | G01M 7/06 |
| | | | | 73/668 |
| 5,736,797 | A * | 4/1998 | Motohashi | H02K 33/16 |
| | | | | 318/128 |
| 5,783,893 | A * | 7/1998 | Dade | H02K 16/00 |
| | | | | 310/266 |
| 6,108,118 | A * | 8/2000 | Minamoto | G02B 26/085 |
| | | | | 359/224.1 |
| 6,405,599 | B1 * | 6/2002 | Patt | G01N 3/02 |
| | | | | 73/779 |
| 6,952,060 | B2 * | 10/2005 | Goldner | B60G 17/0157 |
| | | | | 310/15 |
| 7,287,638 | B1 * | 10/2007 | Sommerhalter, Jr. | H02K 41/03 |
| | | | | 104/294 |
| 7,378,765 | B2 * | 5/2008 | Iwasa | H02K 41/03 |
| | | | | 318/135 |
| 7,554,225 | B2 * | 6/2009 | Kraus | H02K 33/18 |
| | | | | 310/15 |
| 7,569,952 | B1 * | 8/2009 | Bono | H02K 35/02 |
| | | | | 310/15 |
| 7,598,981 | B2 * | 10/2009 | Uenaka | H04N 23/68 |
| | | | | 359/557 |
| 7,808,236 | B1 * | 10/2010 | Huang | H10N 30/00 |
| | | | | 324/249 |
| 7,915,767 | B2 * | 3/2011 | Tang | H02K 41/03 |
| | | | | 310/15 |
| 8,080,906 | B2 * | 12/2011 | Roberts | H02K 35/06 |
| | | | | 310/20 |
| 8,432,049 | B2 * | 4/2013 | Jung | F03D 5/00 |
| | | | | 336/200 |
| 8,629,569 | B2 * | 1/2014 | Roberts | H02K 35/06 |
| | | | | 290/1 R |
| 8,941,251 | B2 * | 1/2015 | Zuo | H02K 35/02 |
| | | | | 290/1 R |
| 8,994,235 | B2 * | 3/2015 | Doll | H02K 16/02 |
| | | | | 310/38 |
| 9,035,732 | B2 * | 5/2015 | Satou | H02K 41/031 |
| | | | | 335/229 |
| 9,121,875 | B2 * | 9/2015 | Fukada | G01R 29/12 |
| 9,124,161 | B2 * | 9/2015 | Kim | H02K 1/278 |
| 9,130,445 | B1 * | 9/2015 | Katz | H02K 41/0356 |
| 9,260,185 | B2 * | 2/2016 | Covington | F16F 15/022 |
| 9,607,491 | B1 | 3/2017 | Mortimer et al. | |
| 10,072,567 | B2 * | 9/2018 | Cockerill | H02K 35/00 |
| 10,160,010 | B2 * | 12/2018 | Chun | H02K 33/16 |
| 10,376,920 | B2 * | 8/2019 | Katada | B06B 1/045 |
| 10,468,928 | B2 * | 11/2019 | Jiang | H02K 1/34 |
| 10,509,472 | B2 | 12/2019 | Grant et al. | |
| 10,566,888 | B2 * | 2/2020 | Degner | H02K 33/18 |
| 10,690,215 | B2 * | 6/2020 | Sakka | F16F 9/18 |
| 10,734,877 | B2 * | 8/2020 | Shahosseini | H02K 16/00 |
| 10,828,674 | B2 | 11/2020 | Sreetharan et al. | |
| 11,338,637 | B2 * | 5/2022 | Dhaens | B60G 17/08 |
| 11,413,924 | B2 * | 8/2022 | Cox | B60G 11/14 |
| 2002/0172060 | A1 * | 11/2002 | Takeuchi | H02K 35/00 |
| | | | | 363/110 |
| 2003/0024492 | A1 * | 2/2003 | Malmquist | F02B 71/04 |
| | | | | 123/46 E |
| 2004/0108781 | A1 * | 6/2004 | Razzell | H02K 51/00 |
| | | | | 310/112 |
| 2004/0150277 | A1 * | 8/2004 | Moriyasu | H02K 33/18 |
| | | | | 310/15 |
| 2005/0016802 | A1 * | 1/2005 | Akami | F16F 15/035 |
| | | | | 188/267 |
| 2005/0081804 | A1 * | 4/2005 | Graf | F02B 71/04 |
| | | | | 903/905 |
| 2005/0140219 | A1 * | 6/2005 | Sanematsu | H02K 33/16 |
| | | | | 310/15 |
| 2005/0185241 | A1 * | 8/2005 | Johnson | H02K 33/02 |
| | | | | 359/227 |
| 2005/0230973 | A1 * | 10/2005 | Fripp | H02K 35/04 |
| | | | | 290/1 R |
| 2006/0125325 | A1 * | 6/2006 | Beaulieu | F16F 1/13 |
| | | | | 322/3 |
| 2006/0175909 | A1 * | 8/2006 | Kraus | B26B 19/282 |
| | | | | 310/12.31 |
| 2006/0255664 | A1 * | 11/2006 | Kraus | H02K 33/16 |
| | | | | 310/36 |
| 2006/0255665 | A1 * | 11/2006 | Kraus | H02K 33/18 |
| | | | | 310/36 |
| 2007/0040457 | A1 * | 2/2007 | Shimizu | A61C 17/3445 |
| | | | | 310/15 |
| 2007/0085425 | A1 * | 4/2007 | Hirashima | H02K 33/16 |
| | | | | 310/15 |
| 2008/0264537 | A1 * | 10/2008 | Behrends | H02K 35/02 |
| | | | | 73/146.5 |
| 2008/0278008 | A1 * | 11/2008 | Roberts | H02K 35/06 |
| | | | | 310/29 |
| 2008/0297119 | A1 * | 12/2008 | Frayne | H02K 35/02 |
| | | | | 322/3 |
| 2010/0194117 | A1 * | 8/2010 | Pabon | H02K 35/02 |
| | | | | 290/1 R |
| 2010/0277012 | A1 * | 11/2010 | Kobayashi | H02K 7/1884 |
| | | | | 310/30 |
| 2010/0289359 | A1 * | 11/2010 | Knaian | H02K 21/44 |
| | | | | 310/195 |
| 2011/0025138 | A1 * | 2/2011 | Chao | H02K 41/03 |
| | | | | 310/12.29 |
| 2011/0101796 | A1 * | 5/2011 | Odajima | H02K 33/16 |
| | | | | 310/25 |
| 2011/0133577 | A1 * | 6/2011 | Lee | H02K 33/18 |
| | | | | 310/15 |
| 2011/0198945 | A1 * | 8/2011 | Nakagawa | H02K 33/16 |
| | | | | 310/12.25 |
| 2011/0316366 | A1 * | 12/2011 | Abbasian | H02K 19/103 |
| | | | | 310/46 |
| 2012/0119596 | A1 * | 5/2012 | Doll | H02K 16/02 |
| | | | | 310/36 |
| 2013/0270927 | A1 * | 10/2013 | Kakuchi | H02K 11/215 |
| | | | | 310/12.31 |
| 2014/0054980 | A1 * | 2/2014 | Andrikowich | H02K 7/14 |
| | | | | 310/12.31 |
| 2014/0217859 | A1 * | 8/2014 | Saito | H02K 1/276 |
| | | | | 310/68 D |
| 2015/0137627 | A1 * | 5/2015 | Katada | H02K 33/16 |
| | | | | 310/25 |
| 2016/0006332 | A1 * | 1/2016 | Liao | H02K 33/16 |
| | | | | 310/29 |
| 2016/0144404 | A1 * | 5/2016 | Houston | H02K 33/00 |
| | | | | 318/114 |
| 2016/0314923 | A1 * | 10/2016 | Tsuneyoshi | H02K 7/1876 |
| 2016/0359401 | A1 * | 12/2016 | Deak, Sr. | H02K 35/02 |
| 2018/0131371 | A1 * | 5/2018 | Liu | H02K 35/02 |
| 2018/0183300 | A1 * | 6/2018 | Fukumoto | H02K 35/02 |
| 2018/0191232 | A1 * | 7/2018 | Zou | H01F 41/0233 |
| 2018/0238411 | A1 * | 8/2018 | Sharkh | H02K 33/06 |
| 2018/0266849 | A1 * | 9/2018 | Chen | G08B 6/00 |
| 2018/0278136 | A1 * | 9/2018 | Odajima | H02K 33/16 |
| 2018/0301969 | A1 * | 10/2018 | Takahashi | H04M 19/04 |
| 2018/0316244 | A1 * | 11/2018 | Fukumoto | H02K 7/1861 |
| 2018/0342938 | A1 * | 11/2018 | Fei | B63H 1/36 |
| 2019/0165662 | A1 * | 5/2019 | Endo | B06B 1/045 |
| 2019/0184428 | A1 * | 6/2019 | Sreetharan | B06B 1/12 |
| 2019/0229601 | A1 * | 7/2019 | Liao | H02K 7/003 |
| 2020/0076287 | A1 * | 3/2020 | Takahashi | H02K 33/06 |
| 2020/0076288 | A1 * | 3/2020 | Nerubenko | F16F 7/1005 |
| 2020/0412222 | A1 * | 12/2020 | Tarelli | H02K 33/16 |
| 2021/0135543 | A1 * | 5/2021 | Deak, Sr. | H02K 1/34 |
| 2021/0218324 | A1 * | 7/2021 | Hashimoto | H02K 33/18 |
| 2021/0318548 | A1 * | 10/2021 | Aschwanden | B06B 1/045 |

FOREIGN PATENT DOCUMENTS

| | | | | |
|---|---|---|---|---|
| EP | | 4087102 A2 * | 11/2022 | H02K 35/02 |
| JP | | 2017212793 A * | 11/2017 | B06B 1/045 |

(56) References Cited

FOREIGN PATENT DOCUMENTS

| WO | WO-2016017584 A1 | * | 2/2016 | ............. B06B 1/045 |
| WO | WO-2016167297 A1 | * | 10/2016 | ............... B06B 1/04 |
| WO | WO-2016167299 A1 | * | 10/2016 | ............... B06B 1/04 |

* cited by examiner

HAPTIC ENGINE BASED ON ANGULAR RESONANT ACTUATOR WITH PIVOT AXIS AND MASS CENTER THAT DIFFER

TECHNICAL FIELD

Embodiments described herein generally relate to an electronic device that communicates a haptic output to a user.

BACKGROUND

A user can configure her electronic device (e.g., a phone) to ring and/or vibrate when the user receives, for example, a call or a message. When the user is notified of an incoming call or message through a vibration or other tactile output, this is considered a "haptic output." In order to provide a haptic output, a phone or other electronic device may include a haptic actuator. There are various types of haptic actuators, such as an eccentric rotating mass (ERM) actuator, a linear resonant actuator (LRA), and a piezoelectric actuator. An ERM actuator often includes a wheel or other object that has its mass center offset from its pivot. Accordingly, when the wheel or other mass spins, a vibration is generated. In an LRA actuator, a mass moves back and forth in a linear direction, in response to a changing magnetic field that is generated when an alternating electrical current flows through a coil. A piezoelectric actuator uses a special type of piezo material which changes its shape when an electric voltage is applied.

The LRA currently used in electronic devices requires many components, and is therefore expensive to build. The ERM actuator requires a full rotation of the movable mass and, therefore, requires more energy to generate a haptic output. The piezoelectric actuator requires a special type of material and is therefore expensive to build.

SUMMARY

Embodiments/aspects described herein generally relate to an electronic device that communicates a haptic output to a user. More particularly, the embodiments/aspects described herein pertain to an angular resonant actuator.

In one aspect, a haptic actuator is described. The haptic actuator may include a housing, a movable mass, a pivot assembly, a spring, an electric coil, and at least one magnet. The pivot assembly may attach the movable mass to the housing. The pivot assembly may define a pivot axis. The movable mass may have a mass offset from the pivot axis along a lever arm that extends perpendicular to the pivot axis. The spring may extend between the movable mass and the housing. The spring may store and release energy received from movement of the movable mass and prevent full rotation of the movable mass about the pivot axis. The electric coil may be attached to the movable mass and intersect the lever arm. The at least one magnet may be attached to the housing and may be at least partially aligned with the electric coil. The movable mass may move with respect to the at least one magnet when a signal is applied to the electric coil.

In a second aspect, an angular resonant actuator is described. The angular resonant actuator may include a housing, a movable mass, a pivot assembly, a spring, and an electric actuator. The pivot assembly may attach the movable mass to the housing and define a pivot axis. The movable mass may have a mass center offset from the pivot axis along a lever arm that extends perpendicular to the pivot axis. The spring may be configured to store and release energy received from movement of the movable mass. The spring may prevent full rotation of the movable mass about the pivot axis. The electric actuator may be coupled to the movable mass and configured to start and brake movement of the movable mass.

In a third aspect, a method for generating a haptic output is described. The method may include receiving a signal at an electric coil of an electric actuator. The signal may cause a movable mass that is imbalanced about a pivot to rotate about the pivot in a first rotational direction. The method may further include storing first energy in a spring assembly as the movable mass rotates about the pivot in the first rotational direction, and releasing the first energy stored in the spring assembly back into the movable mass before the movable mass completes a full rotation about the pivot in the first rotational direction. The method may also include storing second energy in the spring assembly as the movable mass rotates about the pivot in a second rotational direction, and releasing the second energy in the spring assembly back into the movable mass before the movable mass completes a full rotation about the pivot axis in the second rotational direction. Movement of the movable mass in the first rotational direction and the second rotational direction may deliver a haptic output to at least one component of an electronic device.

BRIEF DESCRIPTION OF THE DRAWINGS

Reference will now be made to representative embodiments/aspects illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
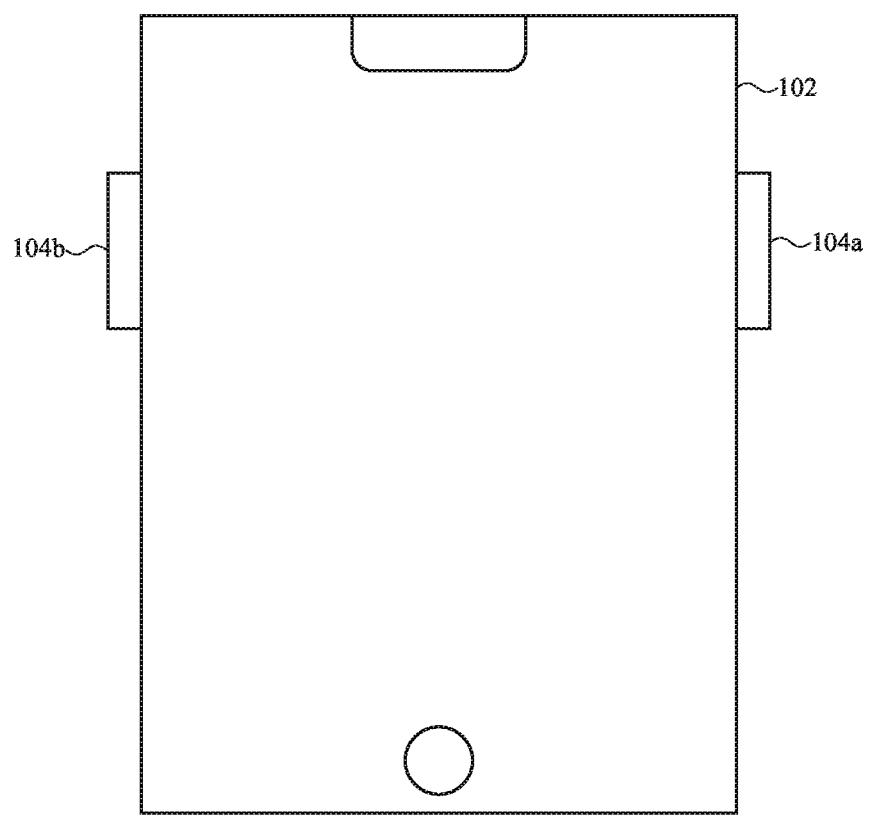
FIG. 1 depicts an example electronic device, as described herein, in accordance with some embodiments.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments/aspects illustrated in the accompanying drawings. It should be understood that the following description is not intended to limit the embodiments to one preferred embodiment. On the contrary, it is intended to cover alternatives, modifications, and equivalents as can be included within the spirit and scope of the described embodiments as defined by the appended claims.

Embodiments described herein include a haptic actuator and a method for generating a haptic output using the haptic actuator. Because the haptic actuator described herein generates a haptic output by partial angular rotation of a movable mass, as described in the present disclosure in detail below, the haptic actuator described herein may be referred to as an angular resonant actuator. A haptic actuator may be used in an electronic device to communicate to a user of the electronic device a haptic output. The haptic output may be generated by causing vibration of the electronic device. The electronic device may vibrate as an imbalanced mass is moved according to movement of an at least one magnet or an electric coil. The at least one magnet or the electric coil attached to the movable mass may move in response to electromagnetic force generated from an electrical current flowing through the electric coil as a result of an electrical input signal to the electric coil. The haptic output generated by currently available haptic actuators often requires more components and/or modules, more energy, and/or more expensive materials in comparison with the haptic actuator, as described herein according to some embodiments. The LRA generates a haptic output by means of a mass moving in a linear direction. The haptic actuator described herein, in accordance with some embodiments, may generate a haptic output by moving a mass within limited angular directions, with an angular extent of rotation that is small enough to approximate linear movement of the mass.

In some embodiments, a haptic actuator may be included in a housing and disposed of in an electronic device. The haptic actuator may be configured to provide a user of the electronic device a haptic output for various reasons. For example, when a call or a text message is received at the electronic device, the electronic device may vibrate to notify the user of the incoming call or text message. The electronic device may also be set to vibrate as a reminder for a task, such as a meeting, a wake-up call, and so on. The electronic device may also vibrate to give the user feedback as the user is providing an input using, for example, a keyboard, a button, a crown, and so on.

In some embodiments, the haptic actuator may include a movable mass. The movable mass may be attached to a pivot assembly. The pivot assembly may define a pivot axis. The movable mass may be configured to rotate partially about the pivot axis. The movable mass may have its center of mass offset from the pivot axis. In other words, the pivot axis may not be at the center of the movable mass. Because the center of the movable mass is offset from the pivot axis, it creates a lever arm that extends perpendicular to the pivot axis. The lever arm may enable the movable mass to move with a low energy in comparison to haptic actuators that are currently used in electronic devices. The movable mass may be made of any material, for example, metal, glass, ceramic, and so on. By way of a non-limiting example, the movable mass may be made of tungsten.

In some embodiments, at least one magnet and an electric coil may be used to initiate (and brake) movement of the movable mass. An electric input, such as an electric current or electric voltage, may cause an electric current to flow through the electric coil. Due to the electric current flowing through the electric coil, an electromagnetic force may be generated in and around the electric coil. The at least one magnet may be attached to the housing and aligned with the electric coil, and may cause the coil to move due to the generated electromagnetic force. In these embodiments, the electric coil may be attached to the movable mass. By way of a non-limiting example, in some embodiments, two magnets may be used. Each magnet of the two magnets may be positioned on a different side of the electric coil. Alternatively, the at least one magnet may be attached to the movable mass and aligned with an electric coil attached to the housing.

In some embodiments, a spring may be used to control movement of the movable mass. The spring may extend between the movable mass and a housing. The spring may be configured to store energy received during movement of the movable mass. The spring may also limit movement of the movable mass so that the movable mass moves within a small angular displacement. Accordingly, the spring may prevent a full rotation of the movable mass about its pivot, which would require more area and possibly more energy. The spring may be configured to store and release energy due to movement of the movable mass. Accordingly, the spring may be configured to release stored energy back into the movable mass, thereby changing a direction of rotation of the movable mass and preventing the movable mass from having a full circular rotation about its pivot axis. The transfer and storage of energy from the movable mass to the spring, which energy is then released from the spring back into the movable mass to change a direction of rotation of the movable mass, is referred to herein as "angular resonance."

In some embodiments, the spring may be of a shape that surrounds the pivot axis. However, in some cases, the spring may not surround the pivot axis. In other words, the shape and structure of the spring may be designed to accommodate an available physical space inside a housing of a haptic actuator, as well as a desired part count. The spring may be made of any material that is capable of storing energy that is generated during the angular movement of a movable mass and releasing the stored energy back to the movable mass.

In some embodiments, the movable mass may rotate about the pivot axis of a pivot assembly in a first angular direction and a second angular direction. The movable mass may rotate up to a first angle, for example, 10 degrees, in the first angular direction, and/or a second angle, for example, 10 degrees, in the second angular direction. In other words, the movable mass may rotate within +10 degrees and −10 degrees with respect to the pivot axis, as defined by a lever arm that extends perpendicular to the pivot axis.

The spring may store energy when the movable mass moves in the first angular direction and may release energy to the movable mass before the movable mass can complete a full rotation about the pivot axis. The energy released to the movable mass may cause the movable mass to change its direction of movement and may cause the movable mass to rotate about the pivot axis in the second angular direction. Movement of the movable mass in the first angular direction and the second angular direction may continue until the electromagnetic force caused by the current provided to the electric coil ceases to exist or is modulated to impart a braking action on the movable mass.

In some embodiments, the pivot axis and an axis of the electric coil both may intersect a lever arm. By way of a non-limiting example, a location at which the axis of the electric coil intersects the lever arm may be more distal from the pivot axis than the mass center of the movable mass. In some cases, a location at which the axis of the electric coil may intersect the lever arm may be more proximate to the pivot axis than the center of the mass of the movable mass. The location at which the axis of the electric coil intersects the lever arm and the distance between the locations at which the axis of the electric coil and the pivot axis intersect the lever arm may affect the movement and pattern of movement of the movable mass. Accordingly, various movement patterns may be generated by selecting the locations at which the axis of the electric coil and the pivot axis intersect the lever arm.

In some embodiments, an electrical input may be provided to the electric coil using coil lead conductors. The coil lead conductors may be routed such that the coil lead conductors do not block movement of the movable mass. As an example, the coil lead conductors may be attached to the movable mass and transition from on the movable mass to off the movable mass at one or more points on the movable mass. The one or more points on the movable mass may be located on a first side of the movable mass that is opposite a second side of the movable mass to which the electric coil may be attached. In some cases, the one or more points on the movable mass may be on the same side of the movable mass at which the electric coil may be attached.

In some embodiments, the point(s) on the movable mass at which the lead conductors' transition from on the movable mass to off the movable mass may be more proximate to the pivot axis than the mass center of the movable mass. This may allow unrestricted movement of the movable mass and may provide less movement of, and less stress on, the lead conductors.

In some embodiments, the electrical input may be provided to the electric coil wirelessly. For example, the electrical input to the electric coil may be wirelessly provided using a near-field communication (NFC) technology. While wirelessly providing electrical input, other components may be insulated from the wireless energy for proper functioning of the haptic actuator.

In some embodiments, a displacement sensor may be used to measure angular displacement of the movable mass and control its movement under a closed feedback loop. For example, the measured displacement of the movable mass may be used to update the electrical input at the electric coil, thereby changing the electromagnetic force moving the movable mass and controlling movement of, or braking, the movable mass.

In some embodiments, a hall effect sensor and an additional magnet attached to the movable mass may be used to determine displacement of the movable mass. The measured displacement based on measurement of the magnetic field created by movement of the additional magnet may be used to generate an adaptive haptic output.

In some embodiments, the additional magnet may be positioned closer to the pivot axis in comparison to the center of mass of the movable mass. The position of the additional magnet and the hall effect sensor may depend on the size of the movable mass and the position and shape of the at least one magnet that is attached to the movable mass and at least partially aligned with the electric coil.

In some embodiments, the hall effect sensor may be mounted on a flexible circuit that is attached to the housing. The flexible circuit may offer an advantage of being light in weight.

In some embodiments, an electric actuator may be used for moving the movable mass. The electric actuator may be, for example, a Lorentz force actuator. The Lorentz force actuator may cause displacement of the movable mass based on a combination of electric and magnetic forces. A carrier of an electrical current, such as an electric coil, may generate electric force. One or more magnets exposed to the electric force may generate a magnetic force. The electric and magnetic forces may cause movement of the movable mass in a desired direction.

In some cases, the Lorentz force actuator may be a single-phase actuator known as a voice-coil actuator. A three-phase Lorentz force actuator may also be used, for example. The length of the electric coil and a number of turns of the electric coil may be selected according to a desired force to be generated for moving the movable mass.

In some embodiments, a reluctance actuator may be used in place of the Lorentz force actuator (e.g., where heat generated by the actuator is required to be low).

In some embodiments, a pivot assembly that attaches the movable mass to a housing may include at least one of a ball bearing, a knife edge, a gel bearing, a bushing, and so on. The pivot assembly may include a knife shaped edge on the movable mass or on the pivot assembly.

The foregoing and other embodiments, and various alternatives thereof and variations thereto, are discussed below with reference to FIGS. 1-8 for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

FIG. 1 depicts an example electronic device, in accordance with some embodiments. An electronic device 102 shown in FIG. 1 may have two buttons 104a and 104b. A user may provide user input by applying force at a button, for example, 104a or 104b, to invoke various functions performed by the electronic device 102. Different functions may be invoked when the user provides input as a force at each of the buttons 104a and/or 104b.

As an example, the functions performed as a result of user input may include turning the volume of a speaker up or down, power cycling the portable electronic device 102 (e.g., turning the portable electronic device 102 on/off), and so on. In some embodiments, in response to user input in the form of a force applied to a button 104a or 104b, haptic feedback may be communicated to the user. The haptic feedback may be communicated to the user as an acknowledgment of the user input and/or as a confirmation that an action is performed in response to the user input.

In some embodiments, a haptic output may be communicated to notify the user of various events, for example, an incoming call or a text message. The haptic output may also be generated to alert the user of an upcoming meeting, or a wake-up alarm. A different haptic output may be generated according to an event for which the haptic output is generated. Based on the different haptic output corresponding to each event, the user may readily ascertain which event occurred.

In some embodiments, there may be more or fewer than two buttons on the electronic device 102. Though a button 104a and a button 104b are shown in FIG. 1 on side edges of the electronic device 102, the buttons 104a and 104b may be positioned at any region of the portable electronic device 102 and in some cases may be solid-state or virtual buttons. Alternatively, the buttons 104a, 104b may be replaced by, or supplemented by, a crown or other type of input device.

In some embodiments, the electronic device 102 may be one or more of a wearable electronic device, a portable electronic device, a laptop computer, a tablet computer, a desktop computer, or any other electronic device configured to receive user input. A portable electronic device may take the form of a mobile phone, a smartphone, an electronic watch, a smartwatch, and so on.

Depending on the type of the electronic device, the electronic device 102 may include a housing, a display, a physical and/or a touchscreen keyboard, a speaker, a microphone, and so on. In some cases, the housing, the display, and/or any component of the electronic device 102 may be flexible and/or bendable. In some cases, various housing components of the electronic device 102 may be made of glass, metal, plastic, and/or any combination thereof.

Figure 2:
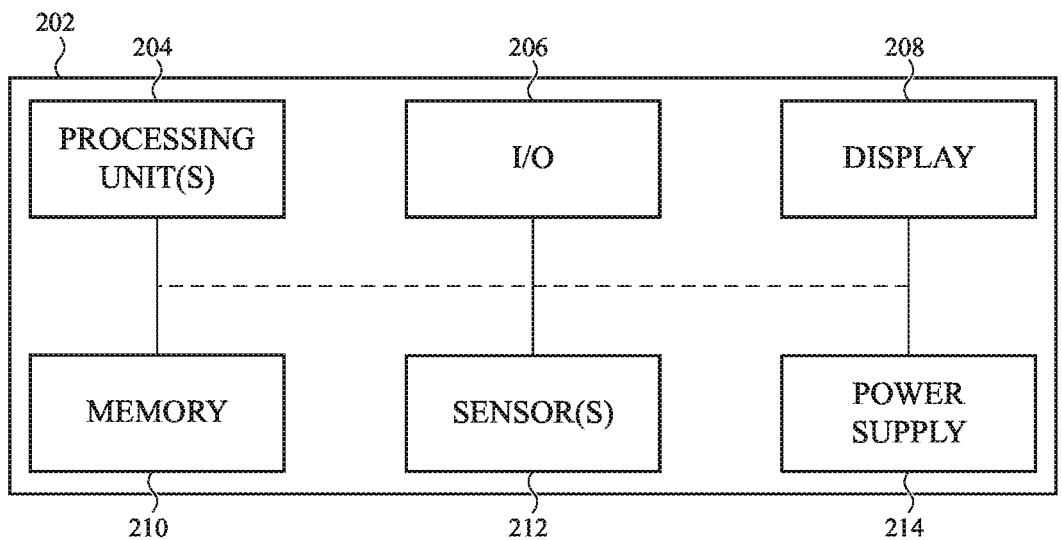
FIG. 2 depicts an example electrical block diagram of the electronic device of FIG. 1, as described herein, in accordance with some embodiments.

FIG. 2 depicts an example electrical block diagram of the electronic device of FIG. 1, in accordance with some embodiments. The electronic device 202, which may be similar to the electronic device shown in FIG. 1, may include one or more processing units 204, an input/output mechanism 206 (e.g., an input/output device, input/output port, button, haptic output interface, or combination thereof), a display 208 (e.g., a light-emitting display), a memory 210 or a storage device, one or more sensors 212, and a power supply 214.

A haptic actuator or a haptic engine, as described herein in accordance with some embodiments, may form part of the input/output mechanism 206 of the electronic device 202.

One or more processing units 204 can communicate, either directly or indirectly, with some or all of the components of the electronic device 202. For example, a system bus or other communication mechanisms can provide communication between the one or more processing units 204, the power supply 214, the memory 210, the one or more sensors 212, the input/output mechanism 206, and the display 208.

The one or more processing units 204 may be implemented as any electronic device capable of processing, receiving, or transmitting data or instructions. By way of a non-limiting example, the one or more processing units 204 may be a microcontroller, a microprocessor, a central processing unit, an application-specific integrated circuit, an integrated circuit, a field-programmable gate array, a digital signal processor, and/or a system-on-chip (SoC), and so on. Accordingly, the term "processing unit" and similar terms and phrases is meant to encompass a single processor or processing unit, multiple processors, multiple processing units, or other suitably configured computing element or elements.

In some embodiments, various components of the electronic device 202 may be controlled by multiple processing units. For example, select components of the electronic device 202 (e.g., a sensor 212) may be controlled by a first processing unit, and other components of the electronic device 202 (e.g., the display 208) may be controlled by a second processing unit, where the first and second processing units may or may not be in communication with each other.

In some embodiments, an input may be processed through a number of processing units. Each processing unit of the number of processing units may process the received input according to the instruction set corresponding to that processing unit and, in some cases, may forward or send a command to other processing units for further processing.

In some embodiments, the power supply 214 may be implemented with any device capable of providing energy to the electronic device 202. For example, the power supply 214 may include one or more batteries. By way of a non-limiting example, the power supply 214 may be or include a power connector or power cord that connects the electronic device 202 to another power supply, such as a wall outlet. In some embodiments, the power supply 214 may be implemented as a USB-powered power supply.

In some embodiments, the memory 210 may store electronic data that may be used by the electronic device 202. For example, the memory 210 may store electrical data or content such as, for example, software instructions, algorithms, audio and video files, documents and applications, device settings and user preferences, timing signals, control signals, and data structures or databases. The memory 210 may be configured as any type of memory. By way of a non-limiting example, the memory 210 may be implemented as random access memory, read-only memory, static random-access memory, flash memory, removable memory, and/or a hard disk, and so on In some embodiments, the electronic device 202 may include one or more sensors 212 positioned almost anywhere on the electronic device 202. The one or more sensors 212 may be configured to sense one or more types of parameters, which by way of a non-limiting example may include pressure, light, touch, heat, movement, relative motion, and/or biometric data (e.g., biological parameters), and so on.

As an example, the one or more sensors 212 may include a force sensor, a displacement sensor, a hall effect sensor, a heat sensor, a position sensor, a light or optical sensor, an accelerometer, a pressure transducer, a gyroscope, a magnetometer, a health monitoring sensor, and so on. In some embodiments, the displacement sensor may be used to determine movement or displacement of a movable mass inside a housing of the haptic engine to provide the user an adaptive haptic output. By way of a non-limiting example, the hall effect sensor may also be used to provide the user an adaptive haptic output. Additionally, the one or more sensors 212 may utilize any suitable sensing technology, including, but not limited to, capacitive, ultrasonic, resistive, optical, ultrasound, piezoelectric, electromagnetic, and thermal sensing technology.

In some embodiments, the I/O mechanism 206 may transmit and/or receive data from a user or another electronic device. An I/O device may include a display, a touch sensing input surface, one or more buttons (e.g., a graphical user interface "home" button, a physical button such as a tactile switch button), one or more cameras, one or more microphones or speakers, one or more ports such as a microphone port, and/or a keyboard. In some embodiments, an I/O device or port can transmit electronic signals via a communications network, such as a wireless and/or wired network connection. Examples of wireless and wired network connections include, but are not limited to cellular, Wi-Fi, Bluetooth, IR, and Ethernet connections.

Figure 3:
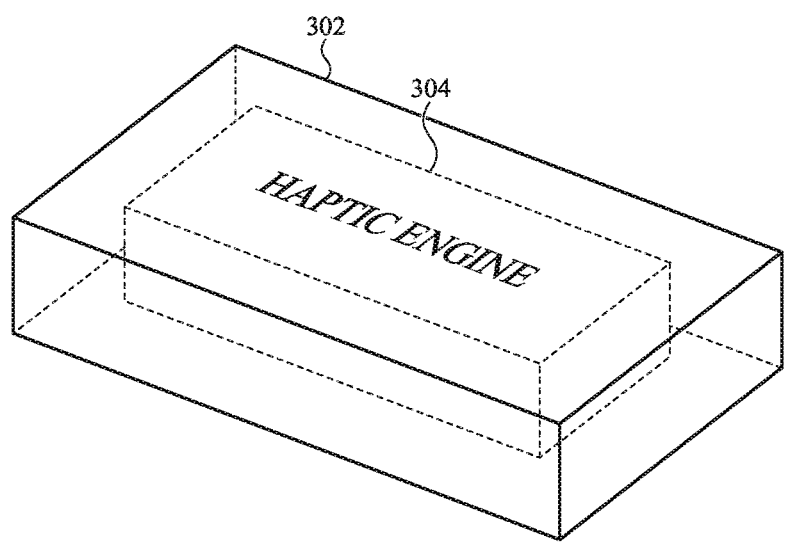
FIG. 3 depicts an example electronic device including a haptic engine, as described herein, in accordance with some embodiments.

FIG. 3 depicts an example electronic device including a haptic engine, in accordance with some embodiments. As shown in FIG. 3, an electronic device 302 may include a haptic engine 304. The electronic device 302 may include aspects of one or more of the electronic devices shown and described herein. The haptic engine 304 may include a housing that includes a plurality of components that cause the electronic device 302 to vibrate and provide a haptic output. The haptic engine 304 may have one or more contacts for providing electrical input signals to cause one or more components inside the haptic engine 304 to move in a controlled manner according to the received electrical input signal. The haptic engine 304 is described in detail below.

In some embodiments, the haptic engine 304 as described herein may generate a haptic output by partial angular rotation of a movable mass. The haptic output may be generated by causing vibration of the electronic device using an imbalanced movable mass inside the housing of the haptic engine 304. The movable mass may be caused to move in response to an electromagnetic force generated as a result of an electric current flowing through an electric coil. The electric current may cause movement of the electric coil with respect to one or more magnets or may cause movement of one or magnets with respect to the electric coil, as a result of changes in an electromagnetic field around the electric coil and through the magnet(s).

The haptic engine 304 may generate a haptic output by moving a mass in an angular direction, with an angle of rotation that is small enough to approximate linear movement of the mass.

Figure 4:
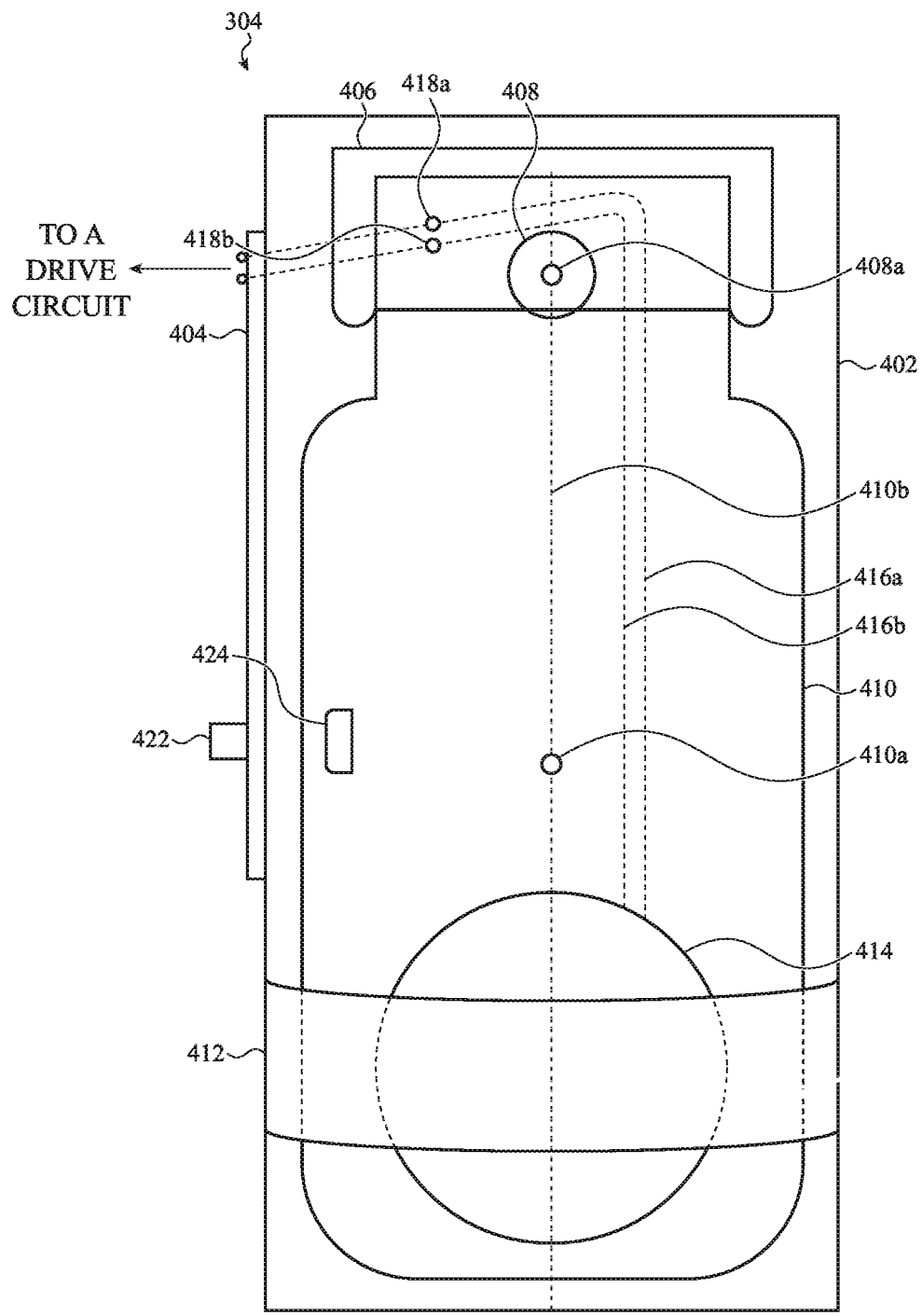
FIG. 4 depicts one view of the haptic engine of the electronic device of FIG. 3, as described herein, in accordance with some embodiments.

FIG. 4 depicts a plan view of one embodiment of the haptic engine described with reference to FIG. 3. As shown in FIG. 4, the haptic engine 304 may include a housing 402. The housing 402 may house a pivot or a pivot assembly 408, a spring or a spring assembly 406, a movable mass 410, one or more magnets 412, and an electric coil 414.

The movable mass 410 may be attached to the pivot assembly 408. The pivot assembly 408 may define a pivot axis 408a. The movable mass 410 may be configured to rotate about the pivot axis 408a. The movable mass 410 may have its mass center 410a offset from the pivot axis 408a. In other words, the pivot axis 408a may not be at the mass center 410a of the movable mass 410. Because the mass center 410a of the movable mass 410 is offset from the pivot axis 408a, it creates a lever arm 410b that extends perpendicular to the pivot axis 408a. The lever arm 410b may enable the movable mass 410 to move in response to a lower energy in comparison with the haptic actuators that are currently used in electronic devices.

In some embodiments, the movable mass 410 may be made of any material, for example, metal, glass, ceramic, and so on. As an example, the movable mass may be made of tungsten.

In some embodiments, to cause movement of the movable mass 410, the one or more magnets 412 and the electric coil 414 may be used. An electric input, for example, an electric current or electric voltage, may cause an electric current to flow through the electric coil 414. Due to the electric current flowing through the electric coil 414, an electromagnetic force may be generated around the electric coil 414. The one or more magnets 412 attached to the housing 402 and aligned with the electric coil 414 may cause the electric coil 414 to move due to the generated electromagnetic force. By way of a non-limiting example, the one or more magnets 412 may be partially aligned with the electric coil 414.

In some embodiments, there may be at least two magnets 412. Each magnet may be positioned on a different side of the electric coil 414.

In some embodiments, the one or more magnets 412 or the electric coil 414 (not both) may be disposed in a recessed area of the movable mass 410. By way of example, FIG. 4 shows the electric coil 414 in a recessed area of the movable mass 410. By placing the electric coil 414 of one or more magnets 412 in a recessed area of the movable mass 410, the size of the haptic engine 304 may be reduced (and the electric coil 414 may be provided a degree of protection when the electric coil 414 is placed in the recessed area).

In some embodiments, the spring or spring assembly 406 may be used to limit movement of the movable mass 410 and cause resonant movement of the movable mass 410. In some cases, the spring 406 may extend between the movable mass 410 and the housing 402. The spring 406 may be configured to store energy received from the movable mass 410 as it moves. The spring 406 may be configured to limit movement of the movable mass 410 to movement within a small angular extent. Accordingly, the spring 406 may prevent a full rotation of the movable mass 410 about the pivot axis 408a of the pivot assembly 408, which full rotation would require more space and, in some cases, more energy to initiate and continue movement of the movable mass 410. The spring 406 may be configured to store and release energy as the movable mass 410 moves. The spring 406 may be configured to store energy as the movable mass 410 moves in one angular direction, and release the stored energy back into the movable mass 410 to change the direction of movement of the movable mass 410.

In some embodiments, the spring 406 may surround the pivot axis 408a. However, in other embodiments, and as shown, the spring 406 may not surround the pivot axis 408a. Having a spring 406 that does not surround the pivot axis 408a can simplify assembly of the spring 406, pivot assembly 408, and movable mass 410, and can improve reliability of the overall device (e.g., the spring 406 does not need to go through the movable mass 410, the movable mass 410 does not need to be attached to a spring that encircles the pivot axis 408a, and the movable mass 410 does not need to bridge the spring in order to be attached to the pivot assembly 408). The spring 406 may be made of any shape memory material that is capable of storing the energy received from movement of the movable mass 410 and releasing the energy back into the movable mass 410.

The movable mass 410 may be attached to the pivot assembly 408. The pivot assembly may define a pivot axis 408a. The movable mass 410 may be configured to rotate partially about the pivot axis 408a. The movable mass 410 may have its center of mass 410a offset from the pivot axis 408a. In other words, the pivot axis 408a may not be at the mass center 410a of the movable mass 410. Because the mass center 410a of the movable mass 410 is offset from the pivot axis 408a, it creates a lever arm 410b that extends perpendicular to the pivot axis 408a. The lever arm 410b may enable the movable mass 410 to move with a low energy in comparison to haptic actuators that are currently used in electronic devices. The movable mass 410 may be made of any material, for example, metal, glass, ceramic, and so on. By way of a non-limiting example, the movable mass 410 may be made of tungsten.

In some embodiments, the spring 406 may be used to control movement of the movable mass 410. The spring 406 may extend between the movable mass 410 and the housing 402. The spring 406 may be configured to store energy received during movement of the movable mass 410. The spring 406 may also limit movement of the movable mass 410 so that the movable mass 410 moves within a small angular displacement. Accordingly, the spring 406 may prevent a full rotation of the movable mass 410 about its pivot 408, which would require more area and possibly more energy. The spring 406 may be configured to store and release energy due to movement of the movable mass 410. Accordingly, the spring 406 may be configured to release stored energy back into the movable mass 410, thereby changing a direction of rotation of the movable mass 410 and preventing the movable mass 410 from having a full circular rotation about its pivot axis 408a. The transfer and storage of energy from the movable mass 410 to the spring 406, which energy is then released from the spring 406 back into the movable mass 410 to change a direction of rotation of the movable mass 410, is referred to herein as "angular resonance," as described above.

Accordingly, the spring 406 may store energy when the movable mass 410 moves in the first angular direction and releases energy to the movable mass 410 before the movable mass 410 can complete a full rotation about the pivot axis 408a. The energy released to the movable mass 410 may cause the movable mass 410 to change its direction of movement and may cause the movable mass 410 to rotate about the pivot axis 408a in a second angular direction. Alternating movement of the movable mass 410 in the first angular direction and the second angular direction may continue as long as the spring 406 and the movable mass 410 remain in resonance.

In some embodiments, the pivot axis 408a and an axis of the electric coil 414 both may intersect the lever arm 410b. By way of a non-limiting example, a location at which the axis of the electric coil 414 may intersect the lever arm 410b may be more distal from the pivot axis 408a than the mass center 410a of the movable mass 410. In some cases, a location at which the axis of the electric coil 414 may intersect the lever arm 410b may be more proximate to the pivot axis 408a than the mass center 410a of the movable mass 410. The location at which the axis of the electric coil 414 intersects the lever arm and the distance between the locations at which the axis of the electric coil 414 and the pivot axis 408a intersect the lever arm 410b may affect the movement and movement pattern of the movable mass 410. Accordingly, various movement patterns may be generated by selecting the locations at which the axis of the electric coil 414 and the pivot axis 408a intersect the lever arm 410b.

In some embodiments, the one or more magnets 412 and an electric coil 414 may be used to initiate (and brake) movement of the movable mass 410. An electric input, such as an electric current or electric voltage, may cause an electric current to flow through the electric coil 414. Due to the electric current flowing through the electric coil 414, an electromagnetic force may be generated in and around the electric coil 414. The one or more magnets 412 aligned with the electric coil may cause the electric coil 414 to move due to the generated electromagnetic force. In these embodiments, the electric coil 414 may be attached to the movable mass 410, and the one or more magnets 412 may be attached to the housing 402. Alternatively, the one or more magnets 412 may be attached to the movable mass 410 and the electric coil 414 may be attached to the housing 402.

In some embodiments, the electrical input may be provided to the electric coil 414 using coil lead conductors 416a and 416b. The coil lead conductors 416a and 416b may be routed such that the coil lead conductors 416a and 416b allow unrestricted movement of the movable mass 410 and may provide less movement of, and less stress on, the coil lead conductors 416a and 416b. By way of a non-limiting example, the coil lead conductors 416a and 416b may be attached on the movable mass 410 at points 418a and 418b. The coil lead conductors 416a and 416b then transition from points 418a and 418b to off the movable mass 410 (e.g., to another set of contacts on a flexible circuit 404, which flexible circuit 404 may carry a drive circuit that allows application of the electrical input to the electric coil 414.

The points 418a and 418b may be on the same side of the movable mass 410 or on opposite sides of the movable mass 410, depending on the available space inside the housing 402 of the haptic engine 304 and/or other factors.

In some embodiments, the one or more points on the movable mass 410 at which the lead conductors 416 may transition from the movable mass 410 may be more proximate to the pivot axis 408a than the mass center 410a of the movable mass 410. By attaching the coil lead conductors 416a and 416b with points 418a and 418b near the pivot 408, where the maximum possible displacement of the movable mass 410 is at or near a minimum, the coil lead conductors 416a and 416b may not interfere with movement of the movable mass 410. Further, the coil lead conductors 416a and 416b attached with points 418a and 418b near the pivot 408 may cause less stress on the coil lead conductors 416a and 416b.

In some embodiments, the electrical input may be provided to the electrical coil 414 wirelessly (e.g., using a near-field communication technology) from the set of contacts on the flexible circuit 404 to the points 418a and 418b on the movable mass, and the coil lead conductors 416a and 416b may carry the electrical input from the points 418a and 418b to the electric coil 414.

In some embodiments, a displacement sensor may be attached to the movable mass 410 to provide an adaptive haptic output. The displacement sensor may be configured to measure displacement of the movable mass 410. The measured displacement of the movable mass 410 may then be used to update the electrical input at the electric coil 414, thereby changing the electromagnetic force moving the movable mass 410. Accordingly, the user may be provided the adaptive haptic output.

In some embodiments, the displacement sensor may include an additional magnet 424 attached to the movable mass 410, and a hall effect sensor 422 attached to the flexible circuit 404. The hall effect sensor 422 may be used to determine displacement of the movable mass 410. The measured displacement, based on measurement of the magnetic field, may be used as feedback to vary the electric input provided to the electric coil 414, causing the movable mass 410 to move accordingly and provide an adaptive haptic output to the user.

By way of a non-limiting example, in some embodiments, the hall effect sensor 422 and the additional magnet 424 may be arranged such that the axis normal to the surface of the hall effect sensor 422 and through the additional magnet 424 is parallel to the pivot axis 408a, e.g., rotated 90 degrees from the pivot axis 408a shown in FIG. 4. Such arrangement of the hall effect sensor 422 and the additional magnet 424 with reference to the pivot axis 408a may be used for a moving magnet architecture such as described below using FIG. 6B. In the moving magnet architecture described using FIG. 6B, a motor magnet also functions as a sensing magnet, e.g., inside the inner diameter of the coil(s) attached to the housing 402.

By way of a non-limiting example, in some embodiments, the additional magnet 424 may be positioned closer to the pivot assembly 408 in comparison to the mass center 410a of the movable mass 410. The position of the additional magnet 424 and the hall effect sensor 422 may depend on the size of the movable mass 410, and the position and shape of the one or more magnets 412 that are attached to the housing 402 and at least partially aligned with the electric coil 414 attached with the movable mass 410.

In some embodiments, an electric actuator may be used for moving the movable mass 410. The electric actuator may be, for example, a Lorentz force actuator. The Lorentz force actuator may cause displacement of the movable mass 410 based on a combination of electric and magnetic forces. A carrier of an electrical current, for example, the electric coil 414, generating electric force, and one or more magnets 412 generating magnetic force, may be arranged in the housing 402 to cause movement of the movable mass 410 in a desired direction.

By way of a non-limiting example, the Lorentz force actuator may be a single-phase actuator known as a voice-coil actuator. A three-phase Lorentz force actuator may also be used, for example. The length of the electric coil 414 and a number of turns of the electric coil 414 may be selected according to a desired force to be generated for moving the movable mass 410.

In some embodiments, by way of a non-limiting example, a reluctance actuator may be used in place of the Lorentz force actuator (e.g., where heat generated by the actuator is required to be low).

An electric actuator, such as a Lorentz force actuator or a reluctance actuator, may be configured to both start and brake movement of the movable mass 410, as described herein.

Figure 5A:
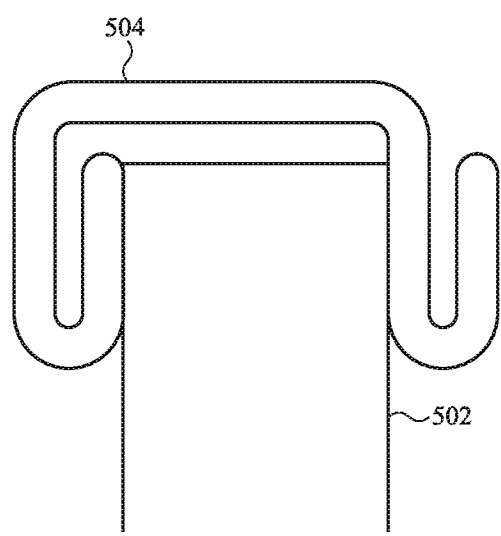
FIG. 5A depicts a section of the haptic engine of the electronic device of FIG. 4, as described herein, in accordance with some embodiments.

FIG. 5A depicts a portion of the haptic engine of the electronic device of FIG. 4. A movable mass 502 and a spring 504 are shown in FIG. 5. The spring 504 may be similar to the spring 406. The spring 504, as shown in FIG. 5, may have a double 'U' shape, with one of the 'U' shapes being positioned on each side of the movable mass 502. As described above, the shape and structure of the spring 504 may be designed to accommodate an available physical space inside a housing 402 of the haptic actuator, as well as a desired part count. The spring 504 may be made of any material that is capable of storing energy that is generated during the angular movement of a movable mass 502 and releasing the stored energy back into the movable mass 502.

Figure 5B:
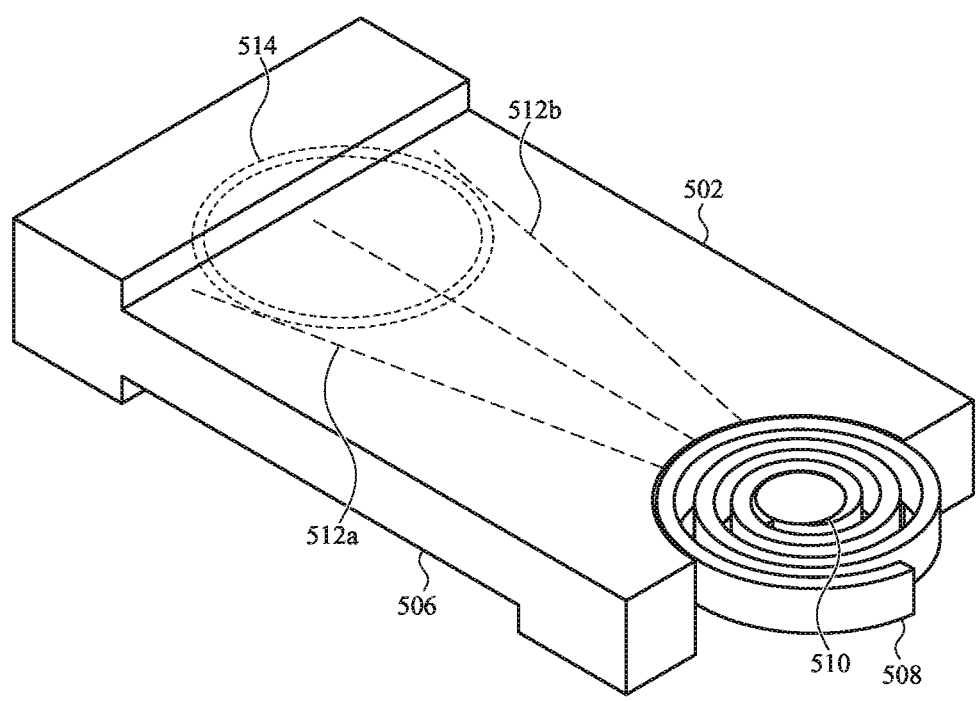
FIG. 5B depicts movement of a movable mass of the haptic engine of the electronic device of FIG. 4, as described herein, in accordance with some embodiments.

FIG. 5B depicts movement of a movable mass of the haptic engine of the electronic device of FIG. 4, as described herein, in accordance with some embodiments. A movable mass 506 may be attached to a pivot assembly 510. A spring 508 may surround the pivot assembly 510. As shown in FIG. 5B, and as described above, an electrical current flowing through the electric coil 514 may generate an electromagnetic field, causing the movable mass 506 to move or rotate in a first angular direction 512a and a second angular direction 512b with respect to one or more magnets that are at least partially aligned with the electric coil 514. The magnets are not shown in FIG. 5B.

The spring 508 differs from the springs described with reference to FIGS. 4 and 5A in that it surrounds the pivot 510. Such a spring 508 (e.g., a coil spring) may be easy to manufacture and provide good resonance when the movable mass 506 is moving. However, such a spring 508 may require welding of the movable mass 506 to the spring 508, or may require a more complicated, more bulky, or less reliable attachment of the movable mass 506 to the spring 508 than what is shown in FIGS. 4 and 5A for example.

In some embodiments, by way of a non-limiting example, rotation of the movable mass 506 in the first angular direction 512a and the second angular direction 512b may be limited. In other words, the movable mass 506 may not rotate about the pivot axis 408a making a full circular rotation. Rather, the rotation of the movable mass 502 or 506 may be of a small angular displacement, for example, +/−5 degrees.

As discussed above, the spring 508 may be attached to the movable mass 506. Accordingly, the spring 508 may move with the movement of the movable mass 506. The spring 508, however, may restrict movement of the movable mass to be within a small angular displacement, for example, +/−5 degrees.

Figure 6A:
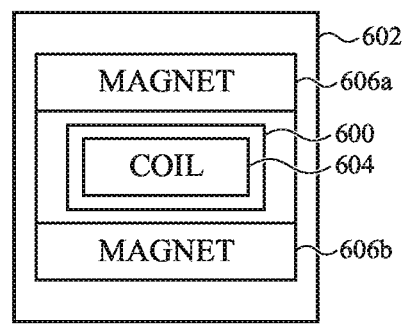
FIG. 6A depicts a cross-sectional view of the haptic engine of the electronic device of FIG. 4, as described herein, in accordance with some embodiments.
Figure 6B:
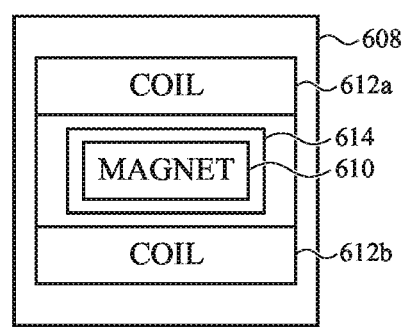
FIG. 6B depicts a cross-sectional view of the haptic engine of the electronic device of FIG. 4, as described herein, in accordance with some embodiments.

FIG. 6A depicts a cross-sectional view of a haptic engine, which in some cases may be the haptic engine described with reference to FIG. 4. As shown in FIG. 6A, an electric coil 604 may be attached to a movable mass 600, and the electric coil 604 and movable mass 600 may be caused to move with respect to a pair of magnets 606a, 606b that are at least partially aligned with the electric coil 604 and attached to a housing 602. Alternatively, and as shown in FIG. 6B, a magnet 610 may be attached to a movable mass 614, and the magnet 610 and movable mass 614 may be caused to move with respect to one or more coils 612a, 612b that are at least partially aligned with the magnet 610 and attached to a housing 608.

Figure 7A:
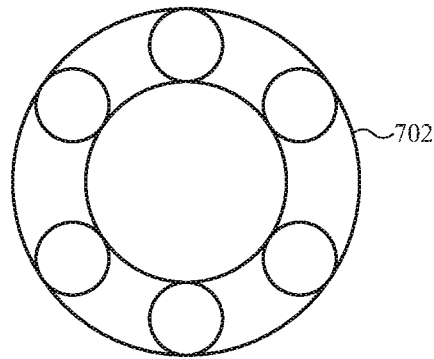
FIG. 7A depicts an example of a pivot assembly, as described herein, in accordance with some embodiments.
Figure 7B:
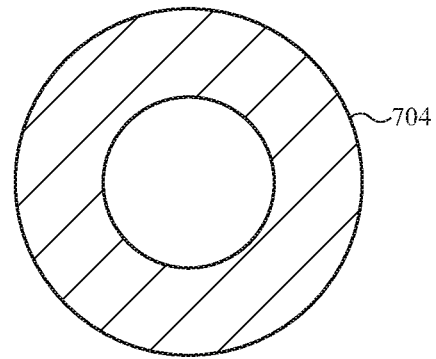
FIG. 7B depicts another example of a pivot assembly, as described herein, in accordance with some embodiments.
Figure 7C:
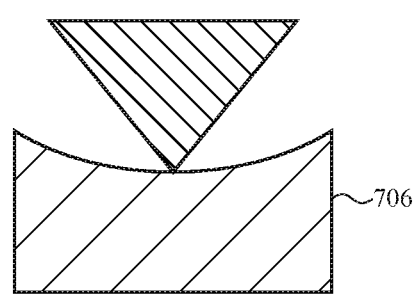
FIG. 7C depicts another example of a pivot assembly, as described herein, in accordance with some embodiments.
Figure 7D:
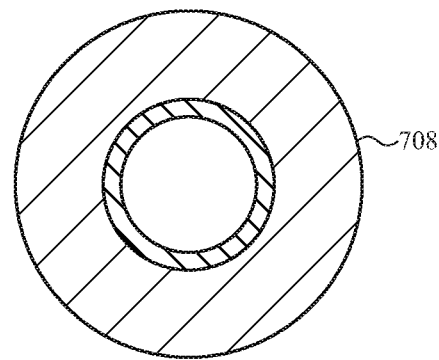
FIG. 7D depicts another example of a pivot assembly, as described herein, in accordance with some embodiments.

FIGS. 7A-7D depict various embodiments of a pivot assembly, as described herein. FIG. 7A depicts a pivot assembly 702 that uses a ball bearing. Since this type of pivot assembly may require more components, the use of a ball bearing pivot assembly may increase the cost of a haptic engine to some extent in comparison with a pivot assembly as shown in any of FIGS. 7B-7D. FIG. 7B depicts a pivot assembly 704 that uses a bushing pivot. FIG. 7C and FIG. 7D depict a knife-edge pivot 706 and a gel bearing pivot 708, respectively. In comparison, the pivot assembly shown in any of the FIGS. 7A-7D may be used. The knife-edge pivot 706 may include a knife edge on the movable mass 410 or on a component of the pivot assembly 408 abutting the movable mass 410.

Figure 8:
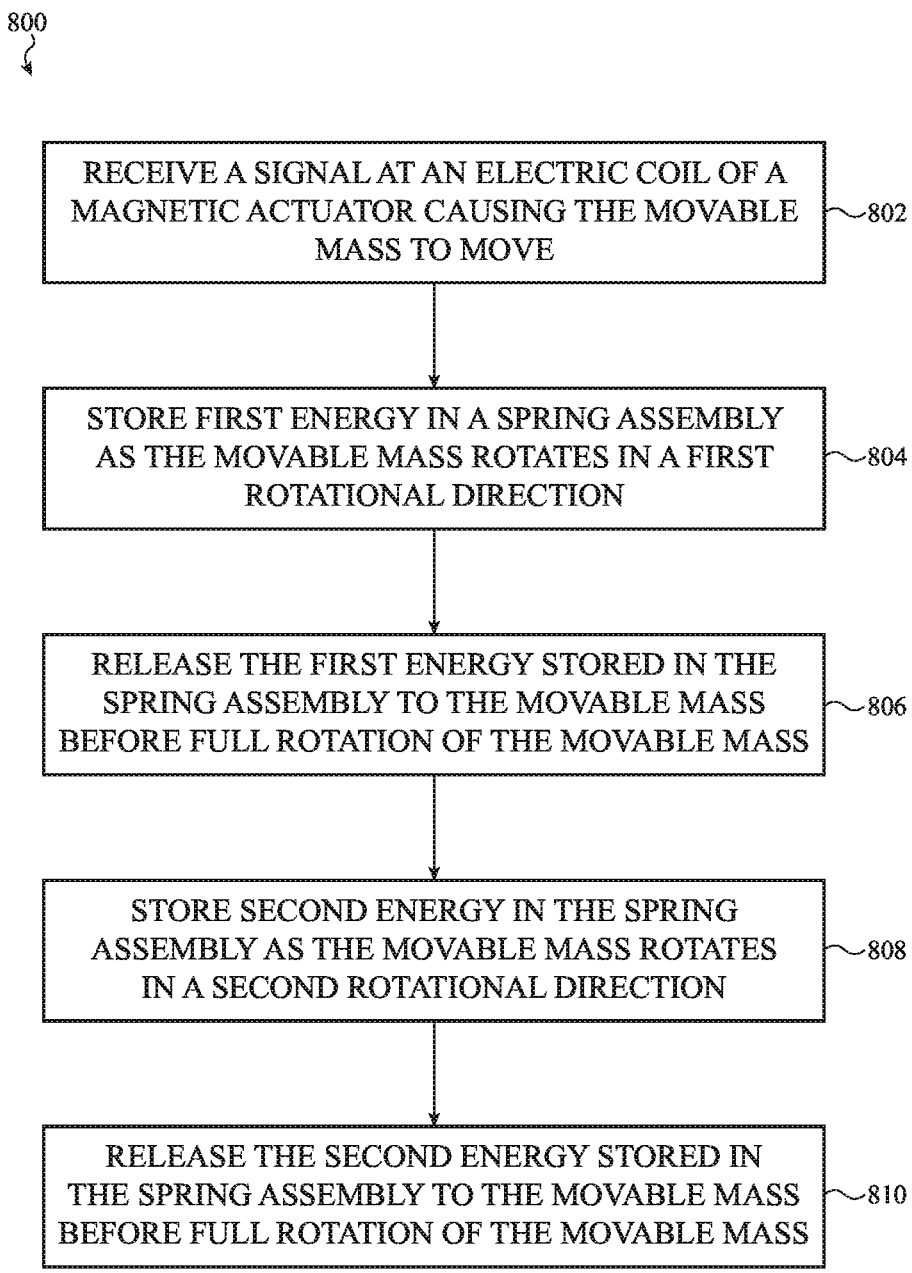
FIG. 8 depicts a method for generating a haptic output, as described herein, in accordance with some embodiments.

FIG. 8 depicts a method for generating a haptic output, as described herein, in accordance with some embodiments. At 802, a signal may be received at an electric coil 414 of a haptic engine 304. The signal may be an electrical signal corresponding to a type of the haptic output to be generated. As stated above, the haptic output may be generated in various patterns to communicate to the user an occurring of an event, for example, an incoming call or a text message, an alarm for a meeting, and so on. The electrical signal at the electric coil 414 may cause an electric current to flow through the electric coil 414 generating an electromagnetic field around the electric coil 414. The electromagnetic field around the electric coil 414 may cause the one or more magnets 412 to move or rotate about a pivot axis 408a of a pivot assembly 408. The one or more magnets 412 attached to the movable mass 410 may cause the movable mass 410 to rotate in a first rotational direction 512a.

At 804, the spring 406 around the movable mass 410 may store first energy as the movable mass 410 rotates about the pivot axis 408a of the pivot assembly 408 in a first rotational direction. The spring 406 may release the first energy stored from moving of the movable mass 410 back to the movable mass 410, at 806. The spring 406 is thus configured to prevent a full rotation of the movable mass 410 while allowing only partial angular displacement of the movable mass 410.

Similarly, at 808, the spring 406 around the movable mass 410 may store second energy as the movable mass 410 rotates about the pivot axis 408*a* of the pivot assembly 408 in a second rotational direction. The spring 406 may release the second energy stored from moving of the movable mass 410 back to the movable mass 410, at 810. The spring 406 is thus configured to prevent a full rotation of the movable mass 410 while allowing only partial angular displacement of the movable mass 410 in the second rotational direction. The rotational displacement of the movable mass thus generates a haptic output to at least one component of an electronic device housing the haptic engine 304.

In conclusion, various embodiments described herein may allow a person skilled in the art to generate a haptic output using a haptic engine, as described herein, that uses less components. The haptic engine, as described herein, thus provides cost effective solutions to currently available haptic actuators for use in electronic or other devices.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A haptic actuator, comprising:
   a housing;
   a movable mass;
   a pivot assembly attaching the movable mass to the housing, the pivot assembly defining a pivot axis, and the movable mass having a mass center offset from the pivot axis along a lever arm extending perpendicular to the pivot axis;
   a spring extending between the movable mass and the housing, the spring storing and releasing energy received from movement of the movable mass, the spring preventing full rotation of the movable mass about the pivot axis;
   an electric coil attached to the movable mass and intersecting the lever arm; and
   at least one magnet attached to the housing and at least partially aligned with the electric coil, wherein:
   the movable mass moves with respect to the at least one magnet when a signal is applied to the electric coil; and
   the electric coil comprises coil lead conductors that transition from on the movable mass to off the movable mass at one or more points on the movable mass, the one or more points on the movable mass located closer to the pivot axis than the mass center.

2. The haptic actuator of claim 1, wherein the electric coil has a coil axis that intersects the lever arm at a location that is more distal from the pivot axis than the mass center.

3. The haptic actuator of claim 1, wherein the electric coil has a coil axis that intersects the lever arm at a location that is more proximate to the pivot axis than the mass center.

4. The haptic actuator of claim 1, wherein the one or more points on the movable mass are located on a first side of the movable mass, the first side of the movable mass opposite a second side of the movable mass to which the electric coil is attached.

5. The haptic actuator of claim 1, further comprising a displacement sensor configured to determine a displacement of the movable mass.

6. The haptic actuator of claim 1, wherein the at least one magnet comprises:
   a first magnet and a second magnet, respectively attached to the housing on opposite sides of the electric coil and at least partially aligned with the electric coil.

7. The haptic actuator of claim 1, wherein the movable mass comprises tungsten.

8. The haptic actuator of claim 1, wherein the spring does not surround the pivot axis.

9. The haptic actuator of claim 1, wherein the spring surrounds the pivot axis.

10. The haptic actuator of claim 1, further comprising:
    an additional magnet attached to the movable mass; and
    a hall effect sensor attached to the housing and generating a signal indicative of changes in a magnetic field caused by movement of the additional magnet.

11. The haptic actuator of claim 10, wherein the additional magnet is positioned closer to the pivot axis than the mass center.

12. The haptic actuator of claim 10, further comprising:
    a flexible circuit attached to the housing; wherein,
    the hall effect sensor is mounted to the flexible circuit.

13. An angular resonant actuator, comprising:
    a housing;
    a movable mass;
    a pivot assembly attaching the movable mass to the housing, the pivot assembly defining a pivot axis, and the movable mass having a mass center offset from the pivot axis along a lever arm extending perpendicular to the pivot axis;
    a spring configured to store and release energy received from movement of the movable mass, the spring preventing full rotation of the movable mass about the pivot axis; and an electric actuator coupled to the movable mass and configured to start and brake the movement of the movable mass, the electric actuator including an electric coil attached to the movable mass, the electric coil having coil lead conductors that transition from on the movable mass to off the movable mass at one or more points on the movable mass, the one or more points on the movable mass located closer to the pivot axis than the mass center.

14. The angular resonant actuator of claim 13, wherein the electric actuator comprises a Lorentz force actuator.

15. The angular resonant actuator of claim 13, wherein the electric actuator comprises a reluctance actuator.

16. The angular resonant actuator of claim 13, wherein the pivot assembly comprises one of a ball-bearing pivot, a bushing pivot, or a gel bearing pivot.

17. The angular resonant actuator of claim 13, further comprising a knife edge on the movable mass or a knife edge on a component of the pivot assembly abutting the movable mass.

* * * * *